United States Patent
An et al.

(10) Patent No.: US 9,419,270 B2
(45) Date of Patent: Aug. 16, 2016

(54) POSITIVE ELECTRODE FOR RECHARGEABLE LITHIUM BATTERY AND RECHARGEABLE LITHIUM BATTERY

(75) Inventors: Jung-Woo An, Yongin-si (KR); Kyeu-Yoon Sheem, Yongin-si (KR); Da-Woon Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 591 days.

(21) Appl. No.: 13/610,504

(22) Filed: Sep. 11, 2012

(65) Prior Publication Data

US 2013/0288111 A1 Oct. 31, 2013

(30) Foreign Application Priority Data

Apr. 30, 2012 (KR) ........................ 10-2012-0045478

(51) Int. Cl.

| H01M 4/64 | (2006.01) |
|---|---|
| H01M 10/056 | (2010.01) |
| H01M 4/13 | (2010.01) |
| H01M 4/62 | (2006.01) |
| B82Y 30/00 | (2011.01) |
| H01M 4/131 | (2010.01) |
| H01M 10/0525 | (2010.01) |

(52) U.S. Cl.
CPC ................ *H01M 4/13* (2013.01); *H01M 4/625* (2013.01); *B82Y 30/00* (2013.01); *H01M 4/131* (2013.01); *H01M 10/0525* (2013.01); *Y02E 60/122* (2013.01)

(58) Field of Classification Search
CPC .... B82Y 30/00; H01M 10/0525; H01M 4/13; H01M 4/131; H01M 4/625; Y02E 60/122
See application file for complete search history.

(56) References Cited

U.S. PATENT DOCUMENTS

| 7,351,498 B2 * | 4/2008 | Watarai et al. ................ 429/217 |
| 2004/0231850 A1 | 11/2004 | McGarian |
| 2004/0234850 A1 | 11/2004 | Watarai et al. |
| 2010/0098877 A1 * | 4/2010 | Cooper et al. ................ 427/551 |
| 2010/0119949 A1 | 5/2010 | Yano et al. |
| 2011/0216476 A1 * | 9/2011 | Fleischer et al. .............. 361/502 |

FOREIGN PATENT DOCUMENTS

| JP | 2003-92105 | 3/2003 |
| JP | 2008-112595 | 5/2008 |
| JP | 2008-277128 | 11/2008 |
| KR | 2003-0086354 | 11/2003 |
| KR | 10-2009-0110469 A | 10/2009 |
| KR | 10-2009-0125280 | 12/2009 |

OTHER PUBLICATIONS

A. Peigney, Ch. Laurent, E. Flahaut, R.R. Bacsa, A. Rousset. Specific surface area of carbon nanotubes and bundles of carbon nanotubes, Carbon 39 (2001), 507-514.*
Full English Machine Translation of JP 2003-092105, 8 pages.
Full English Machine Translation of JP 2008-112595, 13 pages.
KIPO Office action dated Apr. 29, 2016, for Korean priority Patent application 10-2012-0045478, (4 pages).

* cited by examiner

*Primary Examiner* — Carlos Barcena
(74) *Attorney, Agent, or Firm* — Lewis Roca Rothgerber Christie LLP

(57) ABSTRACT

Disclosed is a positive electrode according to one embodiment of the present invention that includes a current collector and a positive active material layer on the current collector, wherein the positive active material layer includes a positive active material and activated carbon coated with a fibrous carbon material.

14 Claims, 1 Drawing Sheet

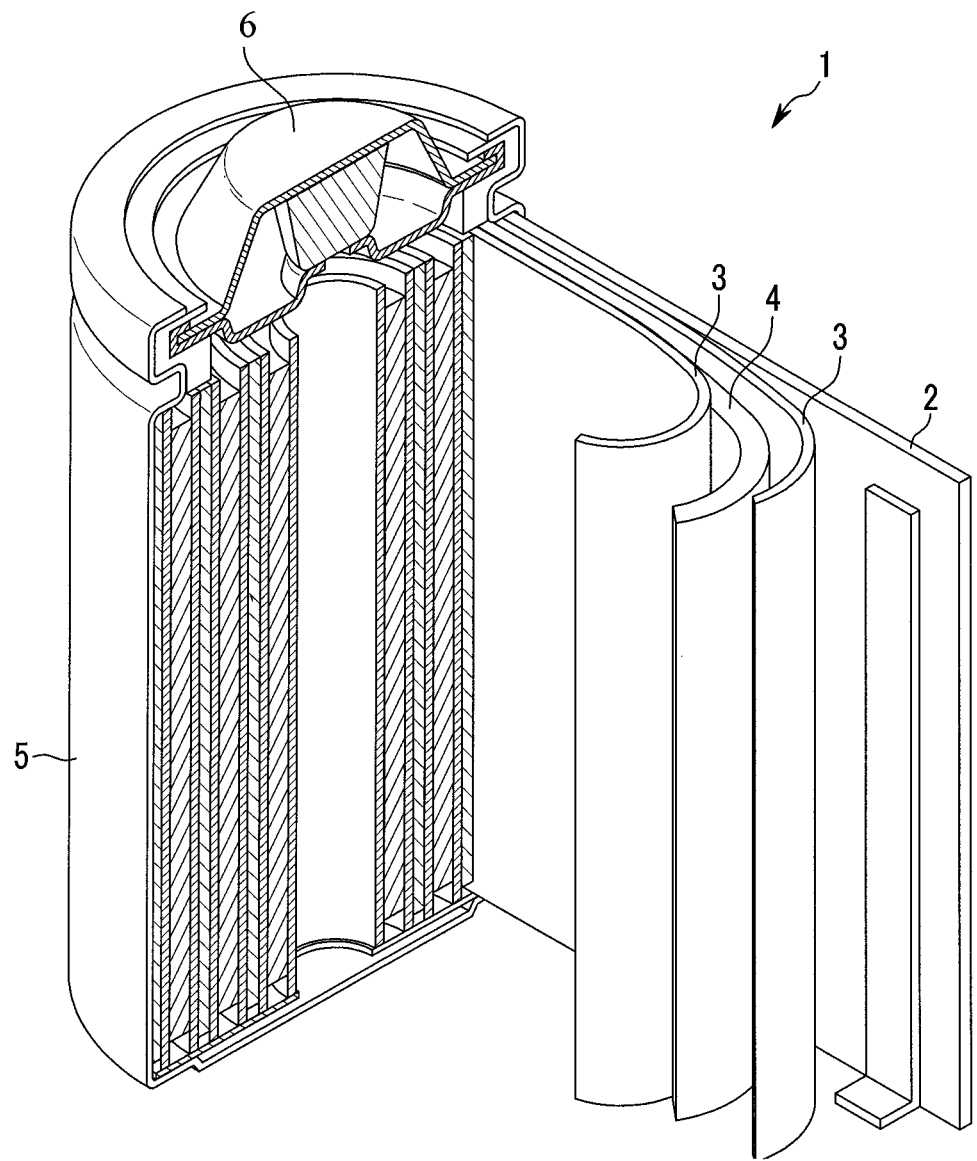
Prior Art

POSITIVE ELECTRODE FOR RECHARGEABLE LITHIUM BATTERY AND RECHARGEABLE LITHIUM BATTERY

CROSS REFERENCE TO RELATED APPLICATION

This application claims priority to and the benefit of Korean Patent Application No. 10-2012-0045478 filed in the Korean Intellectual Property Office on Apr. 30, 2012, the entire content of which is incorporated herein by reference.

BACKGROUND

1. Field

A positive electrode for a rechargeable lithium battery and a rechargeable lithium battery including the same are disclosed.

2. Description of the Related Art

In recent times, due to reductions in size and weight of portable electronic equipments, and popularization of portable electronic devices, researches on rechargeable lithium batteries having high energy density for power source of portable electronic devices have been actively made. Rechargeable lithium batteries include a negative electrode, a positive electrode, and an electrolyte, and generate electrical energy by oxidation and reduction reactions when lithium ions are intercalated/deintercalated in the positive electrode and negative electrode.

Such rechargeable lithium batteries use a lithium metal, a carbon-based material, Si, and the like for a negative active material. For a positive active material of rechargeable lithium batteries, metal chalcogenide compounds being capable of intercalating and deintercalating lithium ions, for example, composite metal oxide such as $LiCoO_2$, $LiMn_2O_4$, $LiNiO_2$, $LiNi_{1-x}Co_xO_2$ (0<X<1), $LiMnO_2$, and the like has been used. Recently, an attempt to make an electrode into a thin film to secure low resistance and thus, accomplish high power characteristics of a rechargeable lithium battery has been made, but was not satisfactory due to characteristics of the active material itself.

SUMMARY

One embodiment of the present invention provides a positive electrode for a rechargeable lithium battery having excellent high-rate capability and cycle-life characteristics.

Another embodiment of the present invention provides a rechargeable lithium battery including the positive electrode.

According to one embodiment of the present invention, a positive electrode for a rechargeable lithium battery includes a current collector; and a positive active material layer on the current collector and including a positive active material and activated carbon coated with a fibrous carbon material.

The fibrous carbon material may have a larger specific surface area than that of the activated carbon. Herein, the fibrous carbon material may have a specific surface area in a range of about 500 $m^2/g$ to about 3000 $m^2/g$, while the activated carbon may have a specific surface area in a range of about 300 $m^2/g$ to about 2000 $m^2/g$.

The fibrous carbon material may be present in the positive active material layer in an amount in a range of about 1 wt % to about 50 wt % based on 100 wt % of the activated carbon.

According to one embodiment of the present invention, the positive active material and the activated carbon may be mixed in a ratio in a range of about 98:2 wt % to about 60:40 wt %.

The positive electrode may further include an ionic conductive layer between the current collector and the positive active material layer. The ionic conductive layer may have a thickness in a range of about 3 μm to about 5 μm. The ionic conductive layer may include a conductive material and an ionic conductive polymer. The conductive material and the ionic conductive polymer may be mixed in a weight ratio in a range of about 1:1 to about 2:8.

The ionic conductive polymer may include a polytetrafluoroethylene-hexafluoropropylene copolymer, a tetrafluoroethylene-hexafluoropropylene copolymer, a polyvinylidene difluoride-hexafluoropropylene copolymer, a vinylidene fluoride-hexafluoropropylene copolymer, polyethylene glycol, polypropyleneoxide, polyethylene oxide, polyacrylate ester, polymethacrylic acid ester, polysiloxane, polyphosphazene, or a combination thereof.

The fibrous carbon material may include carbon nanotubes (CNT), carbon nanofiber (CNF), vapor grown carbon fiber (VGCF), or a combination thereof. For example, the fibrous carbon material may include carbon nanotubes.

According to another embodiment of the present invention, a rechargeable lithium battery includes the positive electrode, a negative electrode including a negative active material, and an electrolyte including an organic solvent and a lithium salt. The negative active material may be amorphous carbon.

According to one embodiment of the present invention, a positive electrode includes activated carbon coated with a fibrous carbon material and thus, has improved electrical conductivity and low resistance, resultantly, providing a lithium rechargeable battery having excellent high-rate charge and discharge and cycle-life characteristics.

BRIEF DESCRIPTION OF THE DRAWING

The accompanying drawing, together with the specification, illustrates an exemplary embodiment of the present invention, and, together with the description, serves to explain the principles of the present invention.

Here, the accompanying drawing is a schematic view showing a rechargeable lithium battery according to one embodiment.

DETAILED DESCRIPTION

Exemplary embodiments will hereinafter be described in detail. However, these embodiments are exemplary, and this disclosure is not limited thereto. As those skilled in the art would recognize, the invention may be embodied in many different forms and should not be construed as being limited to the embodiments set forth herein. Like reference numerals designate like elements throughout the specification.

A positive electrode according to one embodiment of the present invention includes a current collector and a positive active material layer on the current collector, the positive active material layer including a positive active material and activated carbon coated with a fibrous carbon material. Accordingly, a technology of mixing activated carbon as a capacitor material with an active material has been developed.

The fibrous carbon material may have a larger specific surface area than that of the activated carbon. For example, the fibrous carbon material may have a specific surface area in a range of about 500 $m^2/g$ to about 3000 $m^2/g$ (measured using the BET method), while the activated carbon may have a specific surface area in a range of about 300 $m^2/g$ to about 2000 $m^2/g$. In other words, one embodiment of the present invention provides a positive electrode including a fibrous carbon material and an activated carbon having a specific surface area within the above range, in which the fibrous carbon material has a larger specific surface area than that of the activated carbon.

When activated carbon coated with a fibrous carbon material having a larger specific surface area than the activated carbon is used for the positive electrode, the fibrous carbon material may increase distribution of lithium ions and thus, have the effect of the activated carbon physically adsorbing the lithium ions and rapidly transporting a part of the lithium ions to a positive active material and also, provide a path for electrons and thus, increase conductivity. In addition, the fibrous carbon material plays a role of connecting particles and thus, may improve binding strength (e.g., gram force per millimeter or gf/mm) between the positive active material layer and the current collector. Furthermore, the fibrous carbon material having a larger specific surface area than that of the activated carbon is used to coat the activated carbon and thus, increase the surface area of the activated carbon and increase the concentration of lithium ions during the charge and discharge and thereby, improve electrical conductivity of the positive electrode. As a result, the fibrous carbon material may decrease resistance of the positive electrode, and a rechargeable lithium battery including the positive electrode may have improved high-rate and cycle life characteristics during charge and discharge.

The fibrous carbon material may include carbon nanotube (CNT), a carbon nanofiber (CNF), a vapor grown carbon fiber (VGCF), or a combination thereof.

The fibrous carbon material may be included in an amount in a range of about 1 wt % to about 50 wt % and specifically, about 20 wt % to about 30 wt % based on 100 wt % of the activated carbon. When the fibrous carbon material is included in the positive electrode within the above range, the fibrous carbon material may be evenly dispersed on the surface of the activated carbon and provide a positive electrode having more appropriate or suitable cycle life characteristic and high-rate capability.

The positive active material and the activated carbon may be mixed in a ratio in a range of about 98:2 wt % to about 60:40 wt %. Herein, wt % of the activated carbon denotes only the amount of the activated carbon not including the amount of the fibrous carbon material.

According to one embodiment of the present invention, an ionic conductive layer may be interposed between the current collector and the positive active material layer. The ionic conductive layer may further reinforce binding strength between the positive active material layer and the current collector and effectively suppress the positive active material layer from delamination from the current collector despite repetitive charges and discharges. Accordingly, the positive electrode may further improve cycle life characteristic of a lithium rechargeable battery.

In one embodiment, the ionic conductive layer includes a conductive material and an ionic conductive polymer. Herein, the conductive material and the ionic conductive polymer may be mixed in a weight ratio in a range of about 1:1 to about 2:8. When the conductive material and the ionic conductive polymer are mixed within the above range, the positive electrode including them may maintain an appropriate or suitable electrolyte solution impregnation time.

The ionic conductive layer may be in a range of about 3 μm to about 5 μm thick. When the ionic conductive layer has a thickness within the above range, excellent rate, cycle life, and capacity characteristics may be accomplished. In addition, when the ionic conductive layer has a thickness within the above range, the positive electrode may be appropriately or suitably impregnated with an electrolyte solution and have excellent effects due to the ionic conductive layer, as well as have excellent energy density per the same volume and excellent rate characteristic.

The ionic conductive polymer may include a polytetrafluoroethylene-hexafluoropropylene copolymer, a tetrafluoroethylene-hexafluoropropylene copolymer, a polyvinylidenedifluoride-hexafluoropropylene copolymer (PvDF), a vinylidene fluoride-hexafluoropropylene copolymer, polyethylene glycol, polypropylene oxide, polyethylene oxide, polyacrylate ester, polymethacrylic acid ester, polysiloxane, polyphosphazene, or a combination thereof.

The positive active material layer according to one embodiment of the present invention may further include a conductive material and a binder along with the positive active material and activated carbon coated with a fibrous carbon material.

The positive active material may include a compound that reversibly intercalates and deintercalates lithium (e.g., a lithiated intercalation compound). For example, a composite oxide of at least one of cobalt, manganese, nickel, or combination thereof, and lithium may be used.

Examples may be compounds represented by the following formulae:

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0 \le b \le 0.5$, $0 \le C \le 0.05$); $Li_aE_{2-b}X_bO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the above formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed using any suitable method having no adverse influence on the properties of the positive active material by using these elements in the compound. For example, the method may include any suitable coating method, such as spray coating, dipping, and the like, but it is not illustrated in more detail since it is well-known to those who work in the related field.

In the positive active material layer, the mixture of a positive active material and an activated carbon coated with a fibrous carbon material may be in an amount in a range of about 85 wt % to about 98 wt % based on the entire weight of the positive active material layer. The positive active material and the activated carbon coated with a fibrous carbon material may be in an amount in a range of about 90 wt % to about 98 wt %, and the positive active material and the activated carbon coated with a fibrous carbon material may be mixed in a weight ratio in a range of about 98:2 to about 60:40. In addition, the binder and conductive material may be respectively included in an amount in a range of about 1 wt % to about 5 wt % based on the entire weight of the positive active material layer.

The binder improves binding properties of the positive active material particles to each other and to the current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but they are not limited thereto.

The conductive material provides an electrode with conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material such as metal powder or metal fiber including copper, nickel, aluminum, silver, and the like; a conductive polymer such as polyphenylene derivative, or a mixture thereof.

The current collector may be Al, but it is not limited thereto.

The positive electrode may be fabricated by a method including mixing an active material, a conductive material, and a binder in a solvent to prepare an active material composition, and coating the active material composition on a current collector. The solvent includes N-methylpyrrolidone, and the like, but it is not limited thereto.

According to another embodiment of the present invention, a battery including the positive electrode, a negative electrode including a negative active material and an electrolyte is provided.

The negative electrode includes a current collector and a negative active material layer on the current collector, and the negative active material layer includes a negative active material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material for a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide includes vanadium oxide, lithium vanadium oxide, and the like.

In one embodiment of the present invention, as a negative active material, amorphous carbon may improve high-rate performance.

In the negative active material layer, the negative active material may be included in an amount in a range of about 95 wt % to about 99 wt % based on the total weight of the negative active material layer.

The negative active material layer may include a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

Examples of the water-soluble binder include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. Examples of the cellulose-based compound include one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to provide electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The current collector may include one selected from a copper foil, a nickel foil, a stainless steel foil, a titanium foil, a nickel foam, a copper foam, a polymer substrate coated with a conductive metal, and a combination thereof, but it is not limited thereto.

The electrolyte includes an organic solvent and a lithium salt.

The organic solvent serves as a medium of transmitting ions taking part in the electrochemical reaction of the battery and may be a non-aqueous organic solvent.

The organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethyl-propionate, γ-butyrolactone, decanolide, valerolactone, mevalonolactone, caprolactone, and the like. Examples of the ether-based solvent include dibutyl ether, tetraglyme, dig-lyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used singularly or in a mixture. When the organic solvent is used in a mixture, the mixture ratio can be controlled in accordance with a desirable battery performance.

The carbonate-based solvent may include a mixture with a cyclic carbonate and a linear carbonate. The cyclic carbonate and linear carbonate may be mixed together in a volume ratio in a range of about 1:1 to about 1:9. When the mixture is used as an electrolyte, it may have enhanced performance.

In addition, the non-aqueous organic electrolyte may further include an aromatic hydrocarbon-based solvent as well as the carbonate-based solvent. The carbonate-based solvents and aromatic hydrocarbon-based solvents may be mixed together in a volume ratio in a range of about 1:1 to about 30:1.

The aromatic hydrocarbon-based organic solvent may be an aromatic hydrocarbon-based compound represented by the following Chemical Formula 1.

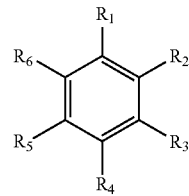

[Chemical Formula 1]

In the above Chemical Formula 1, $R_1$ to $R_6$ are independently hydrogen, a halogen, a C1 to C10 alkyl, a C1 to C10 haloalkyl, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by the following Chemical Formula 2 to improve cycle life.

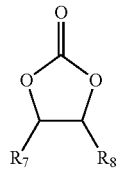

[Chemical Formula 2]

In the above Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyano-ethylene carbonate, fluoroethylene carbonate, and the like. The amount of the additive for improving cycle life may be flexibly used within an appropriate range.

The lithium salt is dissolved in an organic solvent, supplies the battery with lithium ions, basically operates the rechargeable lithium battery, and improves transportation of the lithium ions between the positive and negative electrodes. Examples of the lithium salt include at least one supporting salt selected from $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and LiB ($C_2O_4$)$_2$ (lithium bis(oxalato)borate; LiBOB). The lithium salt may be used in a concentration in a range of about 0.1 M to about 2.0 M. When the lithium salt is included at the above concentration range, an electrolyte may have suitable electrolyte conductivity and viscosity, and may thus have enhanced performance and effective lithium ion mobility.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The accompanying drawing is a schematic view showing the representative structure of a rechargeable lithium battery according to one embodiment. As shown in the accompanying drawing, the rechargeable lithium battery 1 includes a positive electrode 2, a negative electrode 4, and a separator 3 interposed between the positive electrode 2 and negative electrode 4, an electrolyte immersed therein, a battery case 5, and a sealing member 6 sealing the battery case 5.

The following examples illustrate the invention in more detail. These examples, however, are not to be interpreted as limiting the scope of the invention.

PREPARATION EXAMPLE 1

A carbon nanotube solution was prepared by adding carbon nanotubes to an N-methylpyrrolidone solvent and agitating the mixture. The carbon nanotube solution was mixed with activated carbon having an average particle diameter of 7 μm to prepare the activated carbon coated with carbon nanotubes on the surface of the activated carbon. Herein, the carbon nanotubes were included in an amount of 20 wt % based on 100 wt % of the activated carbon.

EXAMPLE 1

A positive active material slurry was prepared by mixing 85 wt % of $LiCoO_2$ having an average particle diameter of 5 μm, 5 wt % of the activated carbon coated with carbon nanotubes according to Preparation Example 1, 4 wt % of an acetylene black (Denka Chemicals Korea Co., Ltd.) conductive material, and 6 wt % of a polyvinylidene fluoride binder in an N-methylpyrrolidone solvent.

The positive active material slurry was coated on a 15 μm-thick Al foil, dried at 100° C., and pressed, fabricating a positive electrode including a positive active material layer having a mass density in a range of about 2 g/cc to 3 g/cc.

Next, a negative active material slurry was prepared by mixing 85 wt % of amorphous soft carbon (having an average particle diameter of 10 μm, Hitachi Ltd.), 5 wt % of acetylene black (Denka Chemicals Korea Co., Ltd.), and 10 wt % of a polyvinylidene fluoride binder in an N-methylpyrrolidone solvent.

The negative active material slurry was coated on a 10 μm-thick Cu foil, dried at 100° C., and pressed, fabricating a negative electrode including a negative active material layer having a mass density in a range of about 1 g/cc to 2 g/cc.

Then, a separator was interposed between the positive and negative electrodes and wound therewith into a cylindrical jelly roll. As for the separator, a 25 μm-thick V25CGD microporous layer made of a polyethylene and polypropylene material was used.

The jelly roll was housed in an 18650-sized battery case, and an electrolyte solution was inserted therein, fabricating a rechargeable lithium battery. The electrolyte solution was prepared by mixing ethylene carbonate and ethylmethyl in a volume ratio of 3:7 and dissolving 1.0M $LiPF_6$ therein.

EXAMPLE 2

A rechargeable lithium battery cell was fabricated according to the same method as Example 1 except for mixing 85 wt % of a $Li(Ni_{1/3}Co_{1/3}Mn_{1/3})O_2$ positive active material having an average a particle diameter of 5 μm, 5 wt % of the activated carbon coated with carbon nanotubes according to Preparation Example 1, 4 wt % of an acetylene black conductive material (Denka Chemicals Korea Co., Ltd.), and 6 wt % of a polyvinylidene fluoride binder in an N-methylpyrrolidone solvent to prepare a positive active material slurry.

EXAMPLE 3

A rechargeable lithium battery cell was fabricated according to the same method as Example 1 except for mixing 85 wt % of a $LiFePO_4$ having an average a particle diameter of 5 μm, 5 wt % of the activated carbon coated with carbon nanotubes according to Preparation Example 1, 4 wt % of an acetylene black conductive material (Denka Chemicals Korea Co., Ltd.), and 6 wt % of a polyvinylidene fluoride binder in an N-methylpyrrolidone solvent to prepare a positive active material slurry.

PREPARATION EXAMPLE 2

A carbon nanotube solution was prepared by adding carbon nanotubes to an N-methylpyrrolidone solvent and agitating the mixture. Next, the carbon nanotube solution was mixed with activated carbon having an average particle diameter of 7 μm, preparing the activated carbon coated with carbon nanotubes on the surface of the activated carbon. Herein, the carbon nanotubes were included in an amount of 10 wt % based on 100 wt % of the activated carbon.

EXAMPLE 4

A rechargeable lithium battery cell was fabricated according to the same method as Example 1 except for mixing 85 wt % of $LiCoO_2$ having an average particle diameter of 5 μm, 5 wt % of the activated carbon coated with carbon nanotubes according to Preparation Example 2, 4 wt % of an acetylene black conductive material (Denka Chemicals Korea Co., Ltd.), and 6 wt % of a polyvinylidene fluoride binder in an N-methylpyrrolidone solvent to prepare a positive active material slurry.

EXAMPLE 5

A rechargeable lithium battery cell was fabricated according to the same method as Example 1 except for mixing 85 wt % of $Li(Ni_{1/3}Co_{1/3}Mn_{1/3})O_2$ having an average particle diameter of 5 μm, 5 wt % of the activated carbon coated with carbon nanotubes according to Preparation Example 2, 4 wt % of an acetylene black conductive material (Denka Chemicals Korea Co., Ltd.), and 6 wt % of a polyvinylidene fluoride binder in an N-methylpyrrolidone solvent to prepare a positive active material slurry.

EXAMPLE 6

A rechargeable lithium battery cell was fabricated according to the same method as Example 1 except for mixing 85 wt % of LiFePO$_4$ having an average particle diameter of 5 μm, 5 wt % of the activated carbon coated with carbon nanotubes according to Preparation Example 2, 4 wt % of an acetylene black conductive material (Denka Chemicals Korea Co., Ltd.), and 6 wt % of a polyvinylidene fluoride binder in an N-methylpyrrolidone solvent to prepare a positive active material slurry.

PREPARATION EXAMPLE 3

A carbon nanotube solution was prepared by adding carbon nanotubes to an N-methylpyrrolidone solvent and agitating the mixture. The carbon nanotube solution was mixed with activated carbon having an average particle diameter of 7 μm, preparing the activated carbon coated with carbon nanotubes on the surface of the activated carbon. Herein, the carbon nanotube was included in an amount of 30 wt % based on 100 wt % of the activated carbon.

EXAMPLE 7

A rechargeable lithium battery cell was fabricated according to the same method as Example 1 except for mixing 85 wt % of LiCoO$_2$ having an average particle diameter of 5 μm, 5 wt % of the activated carbon coated with carbon nanotubes according to Preparation Example 3, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

EXAMPLE 8

A rechargeable lithium battery cell was fabricated according to the same method as Example 7 except for mixing 85 wt % of Li(Ni$_{1/3}$Co$_{1/3}$Mn$_{1/3}$)O$_2$ having an average particle diameter of 5 μm, 5 wt % of the activated carbon coated with carbon nanotubes according to Preparation Example 3, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

EXAMPLE 9

A rechargeable lithium battery cell was fabricated according to the same method as Example 7 except for mixing 85 wt % of LiFePO$_4$ having an average particle diameter of 5 μm, 5 wt % of the activated carbon coated with carbon nanotubes according to Preparation Example 3, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

PREPARATION EXAMPLE 4

A carbon nanotube solution was prepared by adding carbon nanotubes to an N-methylpyrrolidone solvent and agitating the mixture. The carbon nanotube solution was mixed with activated carbon having an average particle diameter of 7 μm, preparing the activated carbon coated with carbon nanotubes on the surface of the activated carbon. Herein, the carbon nanotube was included in an amount of 50 wt % based on 100 wt % of the activated carbon.

EXAMPLE 10

A rechargeable lithium battery cell was fabricated according to the same method as Example 1 except for mixing 85 wt % of LiCoO$_2$ having an average particle diameter of 5 μm, 5 wt % of the activated carbon coated with carbon nanotubes according to Preparation Example 4, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

EXAMPLE 11

A rechargeable lithium battery cell was fabricated according to the same method as Example 10 except for mixing 85 wt % of Li(Ni$_{1/3}$Co$_{1/3}$Mn$_{1/3}$)O$_2$ having an average particle diameter of 5 μm, 5 wt % of the activated carbon coated with carbon nanotubes according to Preparation Example 4, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

EXAMPLE 12

A rechargeable lithium battery cell was fabricated according to the same method as Example 10 except for mixing 85 wt % of LiFePO$_4$ having an average particle diameter of 5 μm, 5 wt % of the activated carbon coated with carbon nanotubes according to Preparation Example 4, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 1

A rechargeable lithium battery cell was fabricated according to the same method as Example 1 except for mixing 85 wt % of LiCoO$_2$ having an average particle diameter of 5 μm, 5 wt % of activated carbon, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 2

A rechargeable lithium battery cell was fabricated according to the same method as Example 1 except for mixing 85 wt % of Li(Ni$_{1/3}$Co$_m$Mn$_{1/3}$)O$_2$ having an average particle diameter of 5 μm, 5 wt % of activated carbon, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 3

A rechargeable lithium battery cell was fabricated according to the same method as Example 1 except for mixing 85 wt % of LiFePO$_4$ having an average particle diameter of 5 μm, 5 wt % of activated carbon, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 4

A rechargeable lithium battery cell was fabricated according to the same method as Example 1 except for mixing 90 wt % of LiCoO$_2$ having an average particle diameter of 5 µm, 5 wt % of activated carbon, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

PREPARATION EXAMPLE 5

A carbon nanotube solution was prepared by adding carbon nanotubes to an N-methylpyrrolidone solvent. The carbon nanotube solution was mixed with activated carbon having an average a particle diameter of 7 µm, preparing the activated carbon coated with carbon nanotubes on the surface of the activated carbon. Herein, the carbon nanotubes were included in an amount of 60 wt % based on 100 wt % of the activated carbon.

COMPARATIVE EXAMPLE 5

A rechargeable lithium battery cell was fabricated according to the same method as Example 1 except for mixing 85 wt % of LiCoO$_2$ having an average particle diameter of 5 µm, 5 wt % of the activated carbon coated with carbon nanotubes according to Preparation Example 5, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 6

A rechargeable lithium battery cell was fabricated according to the same method as Example 5 except for mixing 85 wt % of Li(Ni$_{1/3}$CO$_{1/3}$Mn$_{1/3}$)O$_2$ having an average particle diameter of 5 µm, 5 wt % of the activated carbon coated with carbon nanotubes according to Preparation Example 5, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 7

A rechargeable lithium battery cell was fabricated according to the same method as Example 1 except for mixing 85 wt % of LiFePO$_4$ having an average particle diameter of 5 µm, 5 wt % of the activated carbon coated with carbon nanotubes according to Preparation Example 5, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

PREPARATION EXAMPLE 6

A carbon nanotube solution was prepared by adding carbon nanotubes to an N-methylpyrrolidone solvent. The carbon nanotube solution was mixed with activated carbon having an average particle diameter of 7 µm, preparing activated carbon coated with carbon nanotube on the surface of the activated carbon. Herein, the carbon nanotubes were included in an amount of 80 wt % based on 100 wt % of the activated carbon.

COMPARATIVE EXAMPLE 8

A rechargeable lithium battery cell was fabricated according to the same method as Comparative Example 5 except for mixing 85 wt % of LiCoO$_2$ having an average particle diameter of 5 µm, 5 wt % of the activated carbon coated with carbon nanotubes according to Preparation Example 6, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 9

A rechargeable lithium battery cell was fabricated according to the same method as Comparative Example 8 except for mixing 85 wt % of Li(Ni$_{1/3}$Co$_{1/3}$Mn$_{1/3}$)O$_2$ having an average particle diameter of 5 µm, 5 wt % of the activated carbon coated with carbon nanotubes according to Preparation Example 6, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 10

A rechargeable lithium battery cell was fabricated according to the same method as Comparative Example 8 except for mixing 85 wt % of LiFePO$_4$ having an average particle diameter of 5 µm, 5 wt % of the activated carbon coated with carbon nanotubes according to Preparation Example 6, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 11

A rechargeable lithium battery cell was fabricated according to the same method as Comparative Example 8 except for mixing 85 wt % of LiCoO$_2$ having an average particle diameter of 5 µm, 4.8 wt % of activated carbon, 0.2 wt % of carbon nanotubes, 4 wt % of an acetylene black (Denka Chemicals Korea Co., Ltd.) conductive material, and 6 wt % of a polyvinylidene fluoride binder in an N-methylpyrrolidone solvent to prepare a positive active material slurry.

The rechargeable lithium battery cells according to Examples 1 to 12 and Comparative Examples 1 to 11 were constant current-charged at 0.2 C of current to a voltage of 4.2V. Next, the rechargeable lithium battery cells were constant current discharged at 0.2 C of current to a voltage of 2.0V. After charge and discharge, the capacity of the rechargeable lithium battery cells was measured. The measured capacity was regarded as initial capacity. The results are provided as 0.2 C capacity in the following Table 1.

Then, the rechargeable lithium battery cells were constant current-charged at a current of 1 C to a voltage of 4.2V, and discharged at a current of 50 C to 2.0 V after measurement of the initial capacity. The capacity of the rechargeable lithium battery cells was measured at 50 C and then, a ratio of 50 C discharge capacity to 1 C charge capacity (50 C/1 C, %) was calculated. The results are provided under a 50 C rate in the following Table 1 as high speed discharge characteristic.

In addition, the rechargeable lithium battery cells after measurement of initial capacity were repetitively charged 1000 times at 30 C up to 4.2V and discharged with 30 C down to 2.0V and measured regarding remaining capacity % of 1000th discharge capacity relative to initial capacity.

The results are provided in the following Table 1.

The positive electrodes according to Examples 1 to 12 and Comparative Examples 1 to 11 were measured regarding electrical conductivity using an electrical conductivity measurement device (resistance measurement equipment, made by CIS Corporation). In addition, binding strength (peeling, gf/mm) was measured using a tensile strength measurement device (INSTRON® MODEL 3345 UNIVERSAL TESTING MACHINE, Instron Corporation) to measure binding strength between current collector and positive active material layer. INSTRON® is a registered trademark of Illinois Tool Works Inc., Glenview, Ill. The electrical conductivity and binding strength results are provided in the following Table 1. In the following Table 1, the amount of carbon nanotubes was calculated as wt % based on 100 wt % of activated carbon.

chemical properties than the ones according to Comparative Examples 1, 5, and 8, the ones according to Examples 2, 4, 8, and 11 had better electrochemical properties than the ones according to Comparative Examples 2, 6, and 9, and the ones according to Examples 3, 5, 9, and 12 had better electrochemical properties than the ones according to Comparative Examples 3, 7, and 10.

In addition, the rechargeable lithium battery cell including no activated carbon according to Comparative Example 4 had a positive electrode for which each of conductivity, binding strength, high-rate capability (a 50 C rate), and remaining capacity % was deteriorated as compared with the one according to Example 1. Furthermore, the rechargeable

TABLE 1

|  | Positive active material | Amount of carbon nanotubes (wt %) | Conductivity of positive electrode (S/m) | Binding strength (gf/mm) | 0.2 C capacity (mAh/g) | 50 C rate (50 C/1 C, %) | Remaining capacity %, 30 C/30 C cycle (1000th/1st cycle, %) |
|---|---|---|---|---|---|---|---|
| Example 1 | $LiCoO_2$ | 20 | 0.214 | 16.6 | 120 | 86 | 93 |
| Example 2 | $Li(Ni_{1/3}Co_{1/3}Mn_{1/3})O_2$ | 20 | 0.289 | 10.9 | 128 | 88 | 92 |
| Example 3 | $LiFePO_4$ | 20 | 0.0574 | 11.7 | 115 | 82 | 82 |
| Example 4 | $LiCoO_2$ | 10 | 0.115 | 8.2 | 120 | 86 | 90 |
| Example 5 | $Li(Ni_{1/3}Co_{1/3}Mn_{1/3})O_2$ | 10 | 0.157 | 9 | 129 | 88 | 89 |
| Example 6 | $LiFePO_4$ | 10 | 0.0412 | 7.7 | 117 | 81 | 77 |
| Example 7 | $LiCoO_2$ | 30 | 0.214 | 16.6 | 120 | 86 | 93 |
| Example 8 | $Li(Ni_{1/3}Co_{1/3}Mn_{1/3})O_2$ | 30 | 0.289 | 10.9 | 128 | 88 | 92 |
| Example 9 | $LiFePO_4$ | 30 | 0.0697 | 11.7 | 115 | 82 | 82 |
| Example 10 | $LiCoO_2$ | 50 | 0.201 | 15 | 118 | 85 | 94 |
| Example 11 | $Li(Ni_{1/3}Co_{1/3}Mn_{1/3})O_2$ | 50 | 0.26 | 9.9 | 128 | 88 | 92 |
| Example 12 | $LiFePO_4$ | 50 | 0.0612 | 10.4 | 118 | 84 | 88 |
| Comparative Example 1 | $LiCoO_2$ | 0 | 0.06 | 4.65 | 122 | 83 | 88 |
| Comparative Example 2 | $Li(Ni_{1/3}Co_{1/3}Mn_{1/3})O_2$ | 0 | 0.127 | 3.08 | 132 | 76 | 66 |
| Comparative Example 3 | $LiFePO_4$ | 0 | 0.014 | 4.16 | 116 | 79 | 78 |
| Comparative Example 4 | $LiCoO_2$ | 0 | 0.034 | 1.21 | 130 | 75 | 74 |
| Comparative Example 5 | $LiCoO_2$ | 60 | 0.061 | 3.85 | 120 | 82 | 88 |
| Comparative Example 6 | $Li(Ni_{1/3}Co_{1/3}Mn_{1/3})O_2$ | 60 | 0.12 | 3.27 | 128 | 75 | 67 |
| Comparative Example 7 | $LiFePO_4$ | 60 | 0.017 | 4.07 | 120 | 77 | 74 |
| Comparative Example 8 | $LiCoO_2$ | 80 | 0.057 | 3.2 | 119 | 81 | 82 |
| Comparative Example 9 | $Li(Ni_{1/3}Co_{1/3}Mn_{1/3})O_2$ | 80 | 0.114 | 2.97 | 130 | 75 | 61 |
| Comparative Example 10 | $LiFePO_4$ | 80 | 0.015 | 4.21 | 119 | 72 | 70 |
| Comparative Example 11 | $LiCoO_2$ | — | 0.214 | 11 | 116 | 85 | 88 |

As shown in Table 1, the rechargeable lithium battery cells including activated carbon coated with carbon nanotubes on the surface in a positive electrode according to Examples 1 to 5 and 7 to 12, respectively, had excellent positive electrode conductivity, binding strength, high-rate capability (50 C rate), and remaining capacity %, when compared with the rechargeable lithium batteries using activated carbon coated with no carbon nanotubes on the surface or with an excessive amount of carbon nanotubes according to Comparative Examples 1, 2, and 4 to 10. The rechargeable lithium battery cells according to Example 6 maintained equivalent remaining capacity % with that of the rechargeable lithium battery cell according to Comparative Example 3 and the rechargeable lithium battery cell according to Example 6 had excellent high-rate capability.

In other words, the rechargeable lithium battery cells according to Examples 1, 3, 7, and 10 had better electrochemical properties than the ones according to Comparative Examples 1, 5, and 8, the ones according to Examples 2, 4, 8, and 11 had better electrochemical properties than the ones according to Comparative Examples 2, 6, and 9, and the ones according to Examples 3, 5, 9, and 12 had better electrochemical properties than the ones according to Comparative Examples 3, 7, and 10.

lithium battery cell including a simple physical mixture of carbon nanotubes and activated carbon (i.e., Comparative Example 11), instead of coating activated carbon with carbon nanotubes, had improved binding strength but deteriorated 0.2 C capacity, high-rate capability, and remaining capacity characteristics as compared with the ones according to Comparative Examples 1, 4, 7, and 10.

Based on the aforementioned results, when activated carbon coated with a fibrous carbon material on the surface was used for a positive electrode, a rechargeable lithium battery including the positive electrode might have excellent high power and cycle life characteristics.

EXAMPLE 13

An ionic conductive solution was prepared by mixing carbon black and polytetrafluoroethylene-hexafluoropropylene copolymer (hereinafter, referred to as "PTFE-co-HFP") ionic conductive polymer in a weight ratio of 1:1 in an N-methylpyrrolidone solvent.

The ionic conductive solution was coated to be 3 μm thick on a 15 μm-thick Al foil and dried to form an ionic conductive layer on the Al foil. Then, a positive active material slurry was coated on the ionic conductive layer, dried at 100° C., and pressed, fabricating a positive electrode. The positive active material slurry was prepared according to Example 1.

Then, more of the ionic conductive solution was coated to be 3 μm thick on a 10 μm-thick Cu foil and dried to form a ionic conductive layer on the Cu foil. On that ionic conductive layer, a negative active material slurry was coated, dried at 100° C., and pressed, fabricating a negative electrode. The negative active material slurry was prepared according to Example 1.

EXAMPLE 14

A rechargeable lithium battery cell was fabricated according to the same method as Example 13 except for mixing carbon black and a PTFE-co-HFP ionic conductive polymer in a weight ratio of 7:3 in an N-methylpyrrolidone solvent to prepare an ionic conductive solution and respectively coating the ionic conductive layer on an Al foil and a Cu foil to form an ionic conductive layer.

EXAMPLE 15

A rechargeable lithium battery cell was fabricated according to the same method as Example 13 except for mixing carbon black and a PTFE-co-HFP ionic conductive polymer in a weight ratio of 8:2 in an N-methylpyrrolidone solvent to prepare an ionic conductive solution and respectively coating the ionic conductive layer on an Al foil and a Cu foil to form an ionic conductive layer.

EXAMPLE 16

A rechargeable lithium battery cell was fabricated according to the same method as Example 13 except for mixing carbon black and a PTFE-co-HFP ionic conductive polymer in a weight ratio of 2:8 in an N-methylpyrrolidone solvent to prepare an ionic conductive solution and respectively coating the ionic conductive layer on an Al foil and a Cu foil to form an ionic conductive layer.

COMPARATIVE EXAMPLE 12

A rechargeable lithium battery cell was fabricated according to the same method as Example 13 except for mixing a PTFE-co-HFP ionic conductive polymer in an N-methylpyrrolidone solvent to prepare an ionic conductive solution and respectively coating the ionic conductive layer on an Al foil and a Cu foil to form an ionic conductive layer.

The positive electrodes according to Examples 13 to 16 were measured regarding impregnation properties, binding strength, and conductivity. The results are provided in the following Table 2.

The impregnation properties of the positive electrode was measured by pouring 0.2 g of an electrolyte solution prepared by mixing ethylene carbonate and ethylmethyl carbonate in a volume ratio of 4:6 and dissolving 1.3 mol of $LiPF_6$ in a positive electrode and measuring how long it takes for the electrolyte solution to permeate into the positive electrode.

The binding strength was evaluated by vertically applying a force on the positive electrode and measuring a binding degree between the positive active material layer and the current collector using a tensile strength measurement device made by Instron Corporation.

The conductivity was evaluated by measuring the resistance of the positive electrode substrate to obtain resistivity and then, calculating conductivity.

TABLE 2

|  | Impregnation properties of electrolyte solution [sec] | Binding strength [gf/mm] | Conductivity [S/m] |
| --- | --- | --- | --- |
| Example 13 | 2 | 8.7 | 1.24 |
| Example 14 | 10 | 3.2 | 1.57 |
| Example 15 | 11 | 3 | 1.92 |
| Example 16 | 1 | 12.3 | 0.37 |

EXAMPLE 17

A rechargeable lithium battery cell was fabricated according to the same method as Example 13 except for respectively coating and drying the ionic conductive solution according to Example 13 to be 5 μm thick on an Al foil and a Cu foil to form an ionic conductive layer thereon.

COMPARATIVE EXAMPLE 15

A rechargeable lithium battery cell was fabricated according to the same method as Example 17 except for respectively coating and drying the ionic conductive solution according to Example 13 to be 10 μm thick on an Al foil and a Cu foil to form an ionic conductive layer thereon.

COMPARATIVE EXAMPLE 16

A rechargeable lithium battery cell was fabricated according to the same method as Example 17 except for respectively coating the ionic conductive solution according to Example 13 to be 15 μm thick and drying it on an Al foil and a Cu foil to form an ionic conductive layer thereon.

The rechargeable lithium battery cells according to Example 17 and Comparative Examples 15 and 16 were once charged at 1 C and discharged at 1 C and measured regarding discharge capacity.

EXAMPLE 18

A rechargeable lithium battery cell was fabricated according to the same method as Example 13 except for mixing 70 wt % of $LiCoO_2$ having an average particle diameter of 5 μm, 20 wt % of the activated carbon coated with carbon nanotubes according to Preparation Example 1, 4 wt % of acetylene black (Denka Chemicals Korea Co., Ltd.) conductive material, and 6 wt % of a polyvinylidene fluoride binder in an N-methylpyrrolidone solvent to prepare a positive active material slurry.

COMPARATIVE EXAMPLE 17

A rechargeable lithium battery cell was fabricated according to the same method as Example 13 except for mixing 90 wt % of $LiCoO_2$ having an average particle diameter of 5 μm, 4 wt % of acetylene black (Denka Chemicals Korea Co., Ltd.) conductive material, and 6 wt % of a polyvinylidene fluoride binder in an N-methyl pyrrolidone solvent to prepare a positive active material slurry.

The rechargeable lithium battery cells according to Examples 17 and 18 and Comparative Examples 15 to 17 were measured regarding high-rate charge and discharge characteristic in the following process. The rechargeable lithium battery cells were once charged at 1 C and discharged at 50 C and then, measured regarding discharge capacity. Then, a ratio (50 C/1 C) of the 50 C discharge capacity relative to the 1 C discharge capacity was calculated. The results are provided in the following Table 3.

TABLE 3

|  | High-rate charge and discharge characteristic (50 C/1 C) |
| --- | --- |
| Example 13 | 88% |
| Example 17 | 88% |
| Example 18 | 83% |
| Comparative Example 15 | 85% |
| Comparative Example 16 | 84% |
| Comparative Example 17 | 81% |

As shown in Table 3, the rechargeable lithium battery cells according to Examples 17 and 18 had excellent high-rate charge and discharge characteristics as compared with the ones according to Comparative Examples 15 and 17.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive electrode for a rechargeable lithium battery, comprising:
   a current collector; and
   a positive active material layer on the current collector and comprising a positive active material mixed with activated carbon coated with a fibrous carbon material,
   wherein the fibrous carbon material is present in the positive active material layer in an amount in a range of about 20 wt % to about 50 wt % based on 100 wt % of the activated carbon.

2. The positive electrode of claim 1, wherein the fibrous carbon material has a larger specific surface area than that of the activated carbon.

3. The positive electrode of claim 1, wherein the fibrous carbon material has a specific surface area in a range of about 500 $m^2/g$ to about 3000 $m^2/g$.

4. The positive electrode of claim 1, wherein the fibrous carbon material has a specific surface area in a range of about 300 $m^2/g$ to about 2000 $m^2/g$.

5. The positive electrode of claim 1, wherein the positive active material and activated carbon are mixed in a ratio in a range of about 98:2 wt % to about 60:40 wt %.

6. The positive electrode of claim 1, further comprising an ionic conductive layer between the current collector and the positive active material layer.

7. The positive electrode of claim 6, wherein the ionic conductive layer has a thickness in a range of about 3 µm to about 5 µm.

8. The positive electrode of claim 6, wherein the ionic conductive layer comprises a conductive material and an ionic conductive polymer.

9. The positive electrode of claim 8, wherein the conductive material and the ionic conductive polymer are mixed in a weight ratio in a range of 1:1 to 2:8.

10. The positive electrode of claim 8, wherein the ionic conductive polymer comprises a polytetrafluoroethylene-hexafluoropropylene copolymer, a tetrafluoroethylene-hexafluoropropylene copolymer, a polyvinylidene difluoride-hexafluoropropylene copolymer, a vinylidene fluoride-hexafluoropropylene copolymer, polyethylene glycol, polypropyleneoxide, polyethylene oxide, polyacrylate ester, polymethacrylic acid ester, polysiloxane, polyphosphazene, or a combination thereof.

11. The positive electrode of claim 1, wherein the fibrous carbon material comprises carbon nanotubes (CNT), carbon nanofiber (CNF), vapor grown carbon fiber (VGCF), or a combination thereof.

12. The positive electrode of claim 11, wherein the fibrous carbon material comprises carbon nanotubes.

13. A rechargeable lithium battery, comprising
   the positive electrode according to claim 1;
   a negative electrode including a negative active material; and
   an electrolyte including an organic solvent and a lithium salt.

14. The rechargeable lithium battery of claim 13, wherein the negative active material is amorphous carbon.

* * * * *